(12) United States Patent
Zhu et al.

(10) Patent No.: US 12,259,472 B2
(45) Date of Patent: Mar. 25, 2025

(54) LIDAR AND MOBILE DEVICE

(71) Applicant: SUTENG INNOVATION TECHNOLOGY CO., LTD., Shenzhen (CN)

(72) Inventors: Lin Zhu, Shenzhen (CN); Jing Wang, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/516,926

(22) Filed: Nov. 21, 2023

(65) Prior Publication Data

US 2024/0176021 A1  May 30, 2024

(30) Foreign Application Priority Data

Nov. 29, 2022 (CN) .......................... 202211508889.5

(51) Int. Cl.

| G01S 17/32 | (2020.01) |
|---|---|
| G01S 7/48 | (2006.01) |
| G01S 7/481 | (2006.01) |
| G01S 7/484 | (2006.01) |
| G01S 7/486 | (2020.01) |
| G01S 17/58 | (2006.01) |
| G02B 6/10 | (2006.01) |

(52) U.S. Cl.
CPC .............. G01S 17/32 (2013.01); G01S 7/481 (2013.01); G02B 6/10 (2013.01); *G01S 7/4808* (2013.01); *G01S 7/484* (2013.01); *G01S 7/486* (2013.01); *G01S 17/58* (2013.01)

(58) Field of Classification Search
CPC ........ G01S 17/32; G01S 7/481; G01S 7/4808; G01S 7/484; G01S 7/486; G01S 17/58; G01S 7/4812; G01S 7/4814; G01S 7/4816; G01S 7/4817; G01S 7/4818; G01S 17/34; G01S 17/931; G01S 7/4802; G02B 6/10; G02B 6/42
See application file for complete search history.

(56) References Cited

U.S. PATENT DOCUMENTS

| 11,366,203 | B1 * | 6/2022 | Wood | G01S 7/4818 |
| 2013/0084039 | A1 * | 4/2013 | Doany | H01L 21/302 |
| | | | | 438/31 |
| 2018/0156971 | A1 * | 6/2018 | Droz | G01S 17/00 |
| 2020/0333533 | A1 * | 10/2020 | Rogers | G01S 17/89 |
| 2022/0121080 | A1 * | 4/2022 | Yao | G02F 1/31 |
| 2023/0393352 | A1 * | 12/2023 | Huang | G02B 6/43 |

* cited by examiner

*Primary Examiner* — Georgia Y Epps
*Assistant Examiner* — Monica T Taba
(74) *Attorney, Agent, or Firm* — BAYES PLLC (57) ABSTRACT

This application discloses a LiDAR and a mobile device, where LiDAR includes a lens and a photonic chip, an optical axis of the lens extends along a first preset direction; the photonic chip and the lens are spaced apart along the first preset direction, the photonic chip includes a cladding layer and multiple receiving waveguide core layers, all the receiving waveguide core layers are located at an end of the cladding layer that is closer to the lens and are spaced apart along a second preset direction, each receiving waveguide core layer has a first end surface and a second end surface opposite to each other, the first end surface is closer to the lens than the second end surface; and there is a distance between a first end surface of at least one receiving waveguide core layer and a focal plane of the lens.

13 Claims, 10 Drawing Sheets

LIDAR AND MOBILE DEVICE

CROSS-REFERENCE TO RELATED APPLICATION

The present application claims the benefit of priority to Chinese Patent Application No. 202211508889.5, filed on Nov. 29, 2022, which is hereby incorporated by reference in its entirety.

TECHNICAL FIELD

This application relates to the technical field of LiDAR, and in particular to a LiDAR and a mobile device.

TECHNICAL BACKGROUND

A LiDAR is an optical remote sensing technology of obtaining relevant information about a target object by detecting a scattered light characteristic of the target object. The LiDAR has advantages such as high measurement accuracy and fine temporal and spatial resolution, and can complete functions such as surveying, tracking and imaging recognition. Therefore, the LiDAR has broad application prospects in fields such as smart transportation, autonomous driving, geographical surveying, atmospheric environment monitoring and unmanned aerial vehicles. The LiDAR includes a pulse LiDAR and a coherent LiDAR, and the coherent LiDAR further includes frequency modulated continuous wave LiDAR.

For a frequency modulated continuous wave LiDAR, the frequency modulated continuous wave LiDAR in the related art deflects a direction of a detection signal through a scanning device. In this way, when the LiDAR receives an echo signal formed by reflecting a detection signal by a target object, the scanning device has shifted by an angle compared to its position when the detection signal is emitted (that is, the scanning device shifts by an angle during time of flight of the detection signal), and therefore, a specific position at which the echo signal reaches a light receiving device inside the LiDAR changes along with a detection distance (the detection distance is positively correlated with the time of flight). For ease of description, in this application, the foregoing effect is referred to as a walk-off effect of the LiDAR. Such a walk-off effect not only affects light collection efficiency and reduces optical coupling efficiency, but also may even cause the LiDAR to lose a capability of detecting signal light, that is, the minimum optical coupling efficiency of the echo signal is near 0, which affects overall performance of the LiDAR.

SUMMARY

Embodiments of this application provide a LiDAR and a mobile device, to alleviate an existing problem that the minimum optical coupling efficiency of an echo signal is low due to a walk-off effect in related art.

According to a first aspect, an embodiment of this application provides LiDAR, where LiDAR includes a lens and a photonic chip, an optical axis of the lens extends along a first preset direction, the lens is configured to receive an echo signal and output the echo signal to the photonic chip, and the echo signal is formed after a detection signal emitted by the LiDAR is reflected or scattered by a target object; the photonic chip and the lens are spaced apart along the first preset direction, the photonic chip includes a cladding layer and two or more receiving waveguide core layers embedded in the cladding layer, all the receiving waveguide core layers are located at an end of the cladding layer that is closer to the lens and are spaced apart along a second preset direction, the second preset direction intersects with the first preset direction, each receiving waveguide core layer has a first end surface and a second end surface opposite to each other, the first end surface is closer to the lens than the second end surface, and the first end surface is configured to receive the echo signal output by the lens; and there is a distance between a first end surface of at least one receiving waveguide core layer and a focal plane of the lens.

Based on the LiDAR in the embodiments of this application, compared with a method for designing the first end surface of the receiving waveguide core layer to be coplanar with the focal plane of the lens, in the method for designing a distance between the first end surface of the at least one receiving waveguide core layer and the focal plane of the lens, a light spot formed by the echo signal output by the lens on a side of the lens with the second optical surface actually forms a larger light spot after being incident on the photonic chip. In this way, when the light spot moves to in between two adjacent receiving waveguide core layers, a ratio of an area of the light spot incident on the receiving waveguide core layer to a total area of the light spot becomes larger, and therefore, the optical coupling efficiency of the echo signal can be improved, thereby improving light detection performance of the LiDAR.

According to a second aspect, an embodiment of this application provides a mobile device, where the mobile device includes the foregoing LiDAR.

Based on the mobile device in the embodiments of this application, with the foregoing LiDAR, the mobile device can also alleviate an existing problem that the minimum optical coupling efficiency of an echo signal is low due to the walk-off effect in the related art.

BRIEF DESCRIPTION OF DRAWINGS

To describe the technical solutions in the embodiments of this application or in the related art more clearly, the following briefly describes the accompanying drawings required for describing the embodiments or the related art. Apparently, the accompanying drawings in the following description show merely some embodiments of this application, and a person skilled in the art may still derive other drawings from these accompanying drawings without creative efforts.

Reference signs: 10—lens; 11—first optical surface; 12—second optical surface; 20—photonic chip; 21—cladding layer; 22—receiving waveguide core layer; 221—first end surface; 222—second end surface; 23—emission waveguide core layer; 24—incident waveguide core layer; 25—photoelectric detection module; 251—frequency mixer; 252—balanced photodetector; 26—light splitting module; 261—first light splitter; 262—second light splitter; 27—input waveguide core layer; AA'—first preset direction; BB'—second preset direction; OO'—optical axis; PP'—focal plane; $L_1$—defocus distance; and 2—light spot.

DETAILED DESCRIPTION

To make the objectives, technical solutions, and advantages of this application more comprehensible, the following further describes this application in detail with reference to accompanying drawings and embodiments. It should be understood that the specific embodiments described herein are merely used to explain this application but are not intended to limit this application.

A LiDAR is a radar system that emits a laser beam to detect characteristics such as position, speed, or the like of a target object. From the perspective of working principles, there is no fundamental difference between the LiDAR and microwave radar. The LiDAR emits a detection signal to a target object, then compares a received echo signal reflected from the target object with a local oscillator signal, and can obtain relevant parameters such as distance, azimuth, height, speed, attitude, and even shape of the target object after appropriate processing of the reflected echo signal. Therefore, the LiDAR can be applied to navigation avoidance, obstacle recognition, ranging, speed measurement, autonomous driving and other scenarios of automobile, robot, logistics vehicle, patrol vehicle and other products.

The LiDAR can be divided into a pulse LiDAR and a coherent LiDAR by modulation methods. The coherent LiDAR further includes a frequency modulated continuous wave (FMCW) LiDAR.

In an FMCW LiDAR system, a multi-sided rotating mirror and/or a microelectro-mechanical system (MEMS) galvanometer is usually used to implement beam scanning of a detection signal, to form a detection field of view outside the LiDAR, thereby detecting a target object within the detection field of view. However, when the FMCW LiDAR is working, as the multi-sided rotating mirror rotates and/or the MEMS galvanometer rotates to achieve scanning, a position of a light spot formed by focusing the echo signal on a light receiving device is likely to shift, that is, the foregoing walk-off effect exists. Such a walk-off effect not only affects collection efficiency of the echo signal and reduces the optical coupling efficiency, but also may even cause the LiDAR to lose a capability of detecting signal light, thereby affecting overall performance of the LiDAR.

To resolve the foregoing technical problem, referring to FIG. 1 to FIG. 4, a first aspect of this application provides a LiDAR, which can effectively improve the minimum optical coupling efficiency of the echo signal, thereby improving the light detection performance of the LiDAR.

The LiDAR includes a lens 10 and a photonic chip 20. An optical axis OO' of the lens 10 extends along a first preset direction AA'. The lens 10 is configured to receive an echo signal and output the echo signal to the photonic chip 20, and the echo signal is formed after a detection signal emitted by the LiDAR is reflected or scattered by the target object. The photonic chip 20 and the lens 10 are spaced apart along the first preset direction AA'. The photonic chip 20 includes a cladding layer 21 and two or more receiving waveguide core layers 22 embedded in the cladding layer 21. All the receiving waveguide core layers 22 are located at an end of the cladding layer 21 that is closer to the lens 10 and are spaced apart along a second preset direction BB'. The second preset direction BB' intersects with the first preset direction AA'. Each receiving waveguide core layer 22 has a first end surface 221 and a second end surface 222 opposite to each other, the first end surface 221 is closer to the lens 10 than the second end surface 222, and the first end surface 221 is configured to receive the echo signal output by the lens 10; and there is a distance between a first end surface 221 of at least one receiving waveguide core layer 22 and a focal plane PP' of the lens 10.

A specific structure of the LiDAR is described below with reference to FIG. 1 to FIG. 10.

As shown in FIG. 1 to FIG. 4, the LiDAR includes a lens 10 and a photonic chip 20.

The lens 10 is a component for changing an optical path and adjusting a shape of a light spot in the LiDAR. The lens 10 can be made of plastic or glass.

The optical axis OO' of the lens 10 extends along the first preset direction AA'. In other words, the first preset direction AA' is an extension direction of the optical axis OO' of the lens 10. The lens 10 is configured to receive an echo signal and output the echo signal to the photonic chip 20. When the LiDAR works, the LiDAR can emit a detection signal to a target object within a detection field of view. The detection signal is reflected or scattered by the target object to form the foregoing echo signal. The lens 10 has a first optical surface 11 closer to the target object and a second optical surface 12 farther away from the target object. The echo signal is incident into the lens 10 through the first optical surface 11, directed out of the lens 10 from the second optical surface 12 and further emitted to the photonic chip 20. The lens 10 is configured to focus a laser beam incident through the first optical surface 11, so that the focused laser beam is incident on the photonic chip 20.

As shown in FIG. 1 to FIG. 4, the photonic chip 20 is used as a component for receiving the echo signal output by the lens 10 in the LiDAR, that is, the foregoing light receiving device.

The photonic chip 20 and the lens 10 are spaced apart along the first preset direction AA', that is, the photonic chip 20 is disposed on the optical axis OO' of the lens 10 and does not contact the lens 10.

The photonic chip 20 includes a substrate (not shown), a cladding layer 21 and a receiving waveguide core layer 22. The substrate is a base material during the formation process of the photonic chip 20, and a manufacturing material of the substrate may include, but is not limited to, silicon dioxide. Certainly, in another embodiment of this application, the substrate can also be omitted. The cladding layer 21 is laid on the substrate, is a main structure of the photonic chip 20, and is also a structure to which the foregoing receiving waveguide core layer 22 is attached. A manufacturing material of the cladding layer 21 may include, but is not limited to, silicon dioxide. The receiving waveguide core layer 22 is used as a structure for receiving the echo signal output by the lens 10 in the photonic chip 20. A manufacturing material of the receiving waveguide core layer 22 may include, but is not limited to, silicon and silicon nitride.

The receiving waveguide core layer 22 is embedded in the cladding layer 21, that is, the cladding layer 21 wraps the receiving waveguide core layer 22. A refractive index of the receiving waveguide core layer 22 is greater than that of the cladding layer 21, then the receiving waveguide core layer 22 and the cladding layer 21 jointly form an optical waveguide structure, and the echo signal can propagate via total reflection in the receiving waveguide core layer after entering the receiving waveguide core layer 22.

The receiving waveguide core layer 22 is located at one end of the cladding layer 21 that is closer to the lens 10. The receiving waveguide core layer 22 has a first end surface 221 and a second end surface 222. The first end surface 221 and the second end surface 222 are disposed opposite to each other. The first end surface 221 is closer to the lens 10 than the second end surface 222 and is exposed on the end surface of the cladding layer 21 that faces toward the lens 10. The first end surface 221 is configured to receive the echo signal output by the lens 10, and the second end surface 222 is used for the echo signal to exit the receiving waveguide core layer 22. In this embodiment, the receiving waveguide core layer 22 extends along the first preset direction AA', and the first end surface 221 and the second end surface 222 are disposed opposite to each other along the first preset direction AA'. It can be understood that, in another embodiment of this application, the receiving waveguide core layer 22 can also extend linearly or curvedly in another direction, and the first end surface 221 and the second end surface 222 are disposed opposite to each other along another direction. The echo signal output by the lens 10 is incident into the receiving waveguide core layer 22 through the first end surface 221, and is emitted out of the receiving waveguide core layer 22 from the second end surface 222 after being totally reflected at an interface between the receiving waveguide core layer 22 and the cladding layer 21. Herein, it should be noted that the receiving waveguide core layer 22 and the cladding layer 21 have the same width in the figure, but a width relationship therebetween is not limited in this application. The width of the cladding layer 21 can also be greater than that of the receiving waveguide core layer 22, provided that the foregoing receiving waveguide core layer 22 is provided at the end of the cladding layer 21 that is closer to the lens 10.

In this embodiment, the photonic chip 20 includes multiple receiving waveguide core layers 22, where "multiple" in this application means "two or more." For example, the photonic chip 20 may include two, three, four, five, six or more receiving waveguide core layers 22. The specific number of receiving waveguide core layers 22 is not limited herein and can be designed properly by a person skilled in the art based on an actual requirement. All the receiving waveguide core layers 22 are spaced apart along the second preset direction BB', that is, any two receiving waveguide core layers 22 do not come into contact along the second preset direction BB'. The second preset direction BB' intersects with the first preset direction AA'. That is, in a plane in which the second preset direction BB' and the first preset direction AA' are located, the second preset direction BB' is not parallel to the first preset direction AA' or the second preset direction BB' has a component perpendicular to the first preset direction AA'. In this embodiment, the second preset direction BB' is perpendicular to the first preset direction AA'. It can be understood that, in another embodiment of this application, the second preset direction BB' and the first preset direction AA' can also form another angle.

It should be noted that as a detection distance of the detection signal increases, time of flight of the detection signal also increases. During the time of flight of the detection signal, the foregoing scanning device has already shifted by an angle relative to a position when the detection signal is emitted. The angle may gradually increase as the time of flight of the detection signal increases. Therefore, shift of a position at which the echo signal formed after the detection signal is reflected or scattered by the target object finally arrives at the photonic chip 20 also gradually increases. Because a scanning direction of the LiDAR is actually equivalent to a coupling of a horizontal scanning direction and a vertical scanning direction, shift of a position at which the echo signal finally arrives at the photonic chip has position shift components in directions of the walk-off effect caused in the two scanning directions. Because a field of view in the horizontal scanning direction is larger than a field of view in the vertical scanning direction, a scanning rate in the horizontal scanning direction is generally greater than a scanning rate in the vertical scanning direction, then a position shift component in the direction of the walk-off effect (hereinafter, referred to as a first component direction) caused in the horizontal scanning direction is greater than a position shift component in the direction of the walk-off effect (hereinafter, referred to as a second component direction) caused in the vertical scanning direction. Receiving waveguide core layers 22 in the photonic chip 20 are structures for receiving an echo signal. In this embodiment, an arrangement direction of the receiving waveguide core layers 22 is consistent with the first component direction. It can be understood that, in another embodiment of this application, the arrangement direction of the receiving waveguide core layers 22 can also be consistent with an actual shift direction of the echo signal on the photonic chip 20, which can be specifically implemented by adjusting a disposition angle of the photonic chip 20.

Generally, the echo signal output by the lens 10 forms a light spot 2 on the side of the lens 10 with the second optical surface 12. To focus light spots 2 on the photonic chip 20, the first end surface 221 of each receiving waveguide core layer 22 and the focal plane PP' of the lens 10 overlap. The focal plane PP' of the lens 10 marked with dotted lines in FIG. 2 and FIG. 4 overlap with the first end surface 221 of the receiving waveguide core layer 22. However, in the foregoing solution, when the light spot 2 is located between two adjacent receiving waveguide core layers 22, more energy cannot enter the receiving waveguide core layer 22; and if a distance between the two adjacent receiving waveguide core layers 22 is greater than or equal to the size of the light spot 2 of the echo signal on the focal plane PP', it is possible that each receiving waveguide core layer 22 cannot receive the echo signal at all. That is, the optical coupling efficiency of the photonic chip 20 is extremely low, and may even be as low as or close to 0. To overcome the foregoing shortcoming, in this application, the photonic chip 20 is further improved. In some embodiments, there is a distance between the first end surface 221 of at least one receiving waveguide core layer 22 and the focal plane PP' of the lens 10 (that is, a plane that passes through a focal point of the lens 10 and that is perpendicular to the optical axis OO' of the lens 10). For ease of description, the distance between the first end surface 221 of the receiving waveguide core layer 22 and the focal plane PP' of the lens 10 is referred to as a "defocus distance $L_1$" below. The defocus distance $L_1$ can be obtained by measuring a distance between the focal plane PP' and a center point of the first end surface 221.

Figure 1:
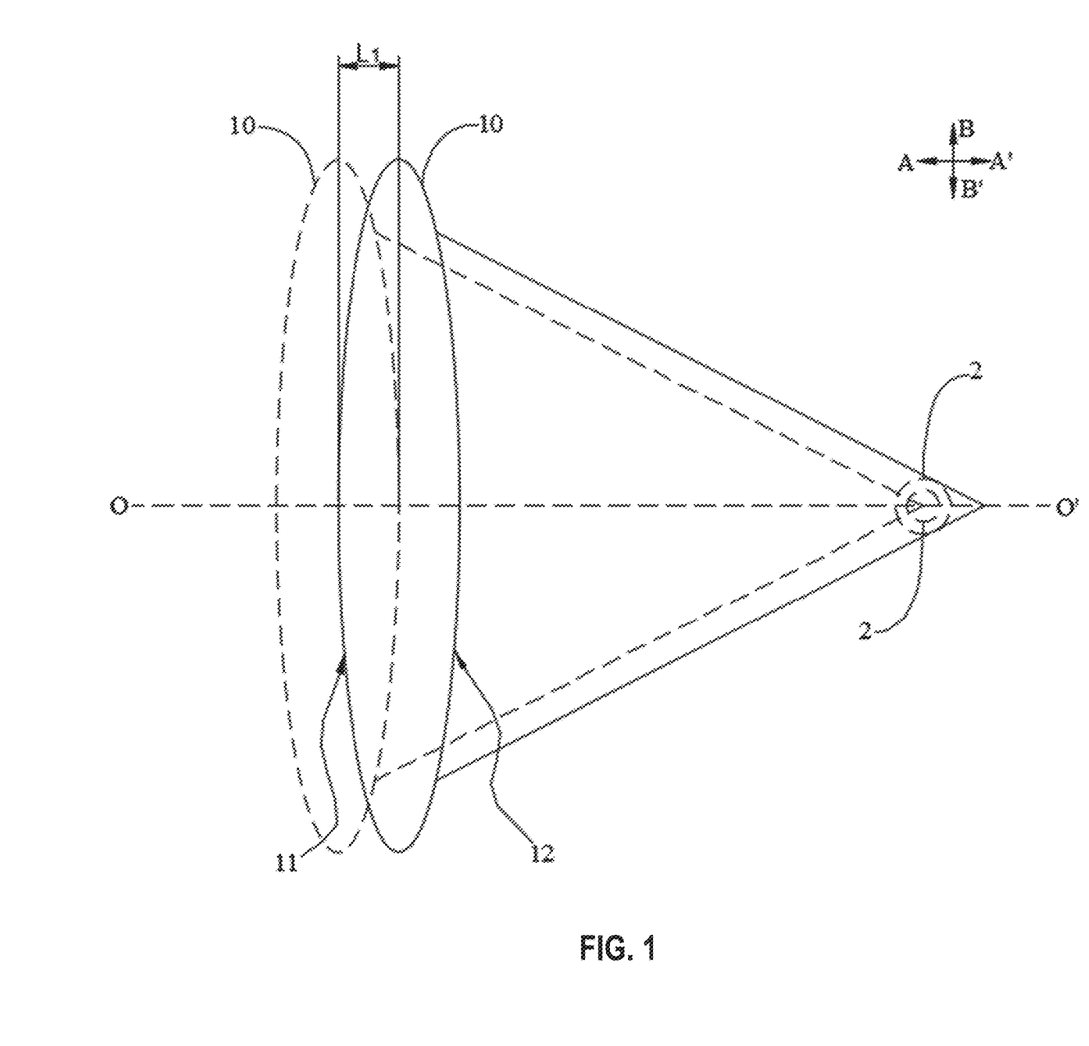
FIG. 1 is a schematic diagram of light spot imaging when a first end surface of the receiving waveguide core layer is closer to a lens than a focal plane of the lens according to an embodiment of this application.
Figure 2:
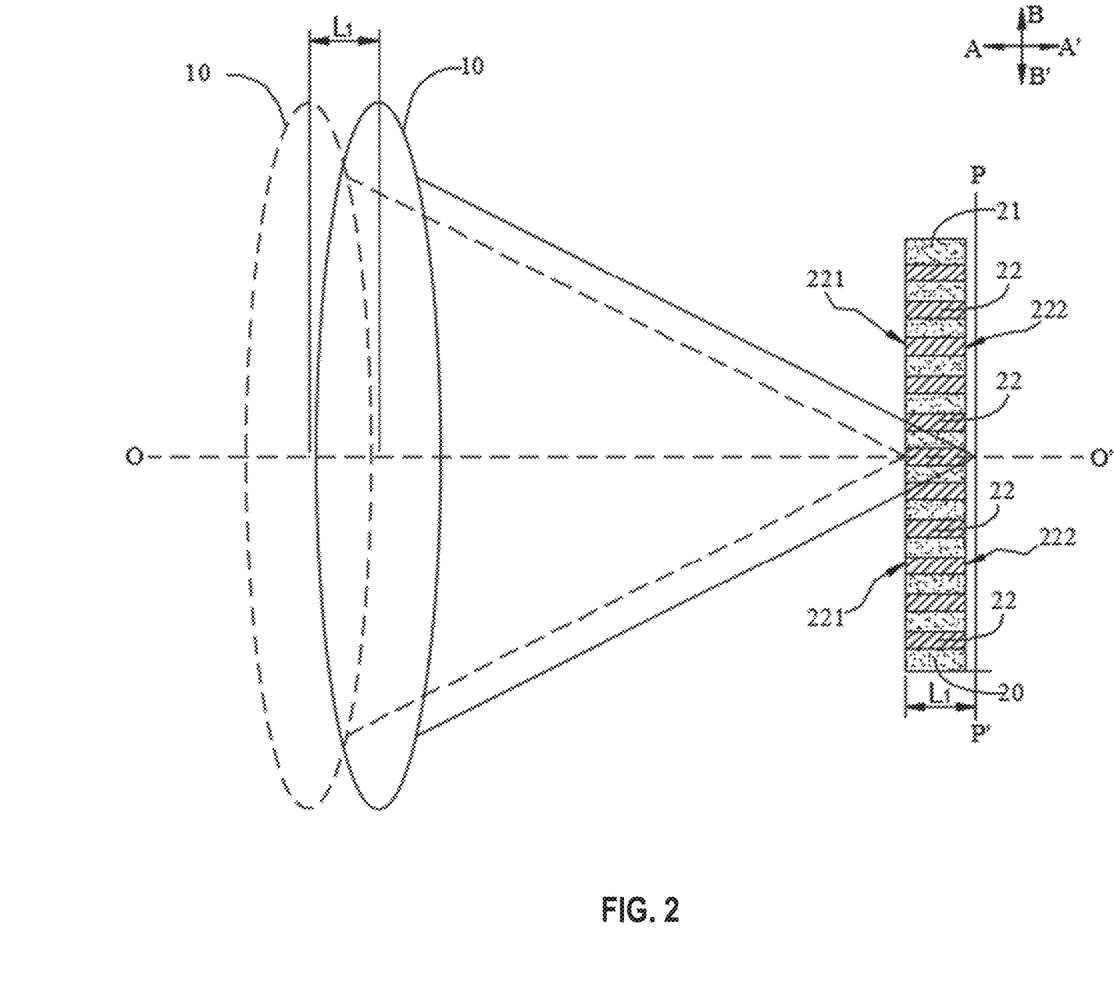
FIG. 2 is a schematic structural diagram illustrating that a first end surface of the receiving waveguide core layer is closer to a lens than a focal plane of the lens according to an embodiment of this application.
Figure 3:
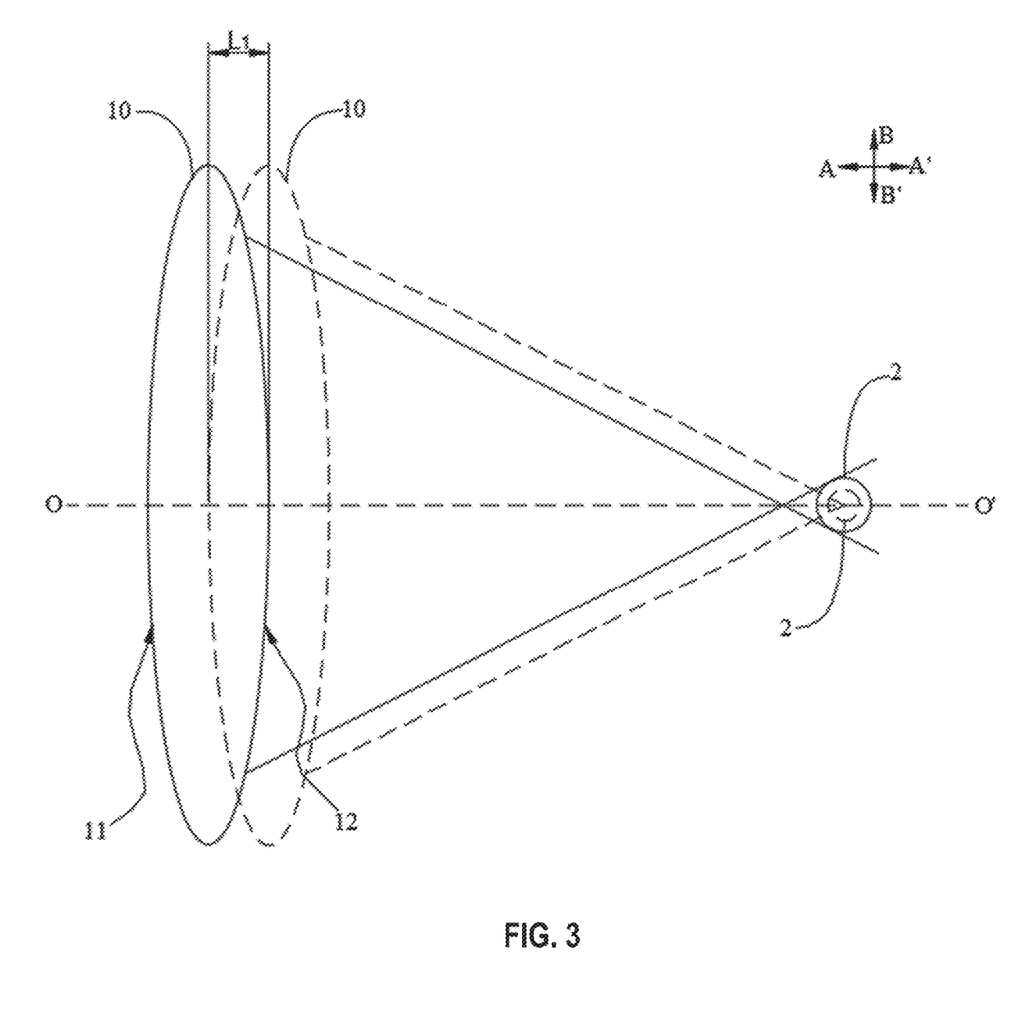
FIG. 3 is a schematic diagram of light spot imaging when a first end surface of the receiving waveguide core layer is farther away from a lens than a focal plane of the lens according to an embodiment of this application.
Figure 4:
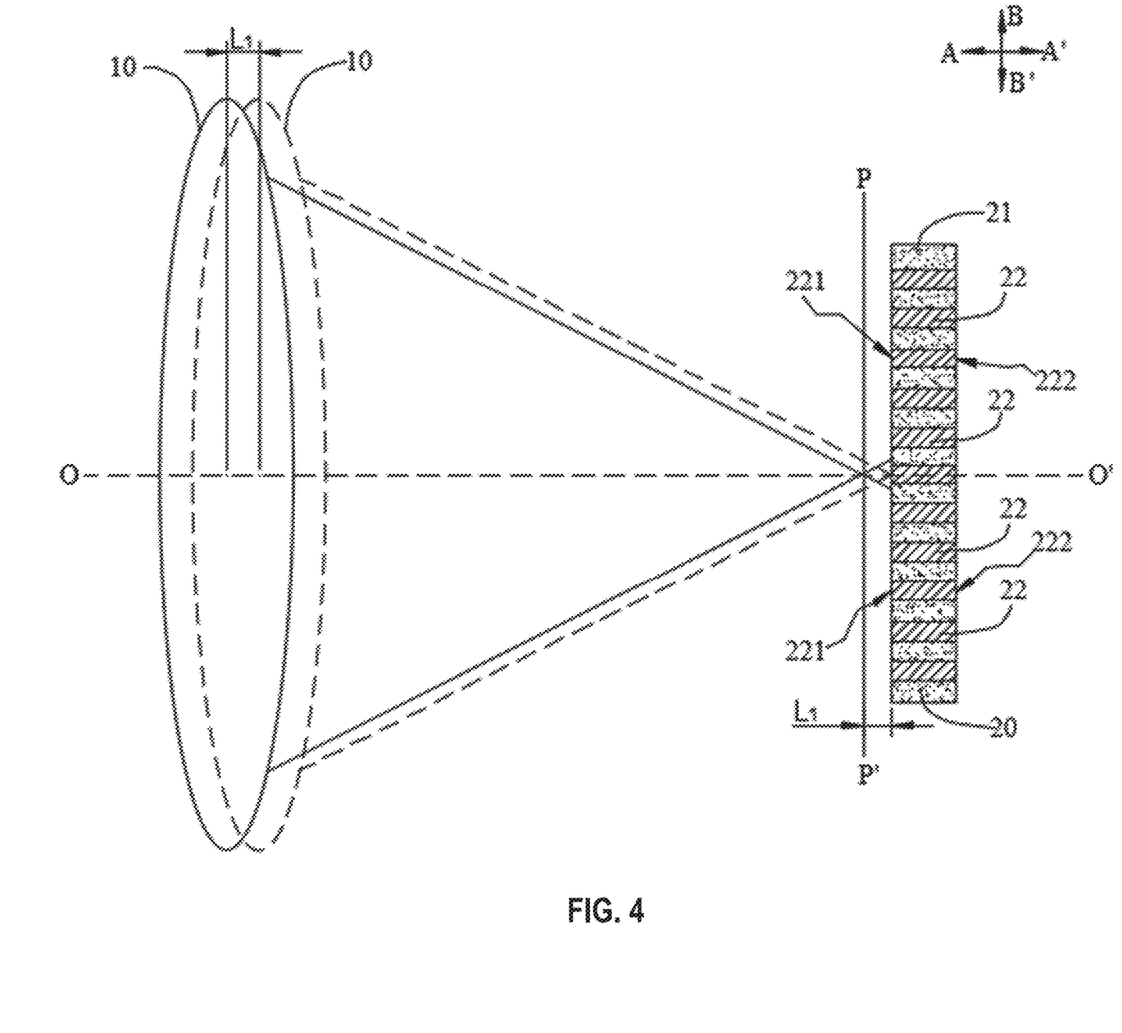
FIG. 4 is a schematic structural diagram illustrating that a first end surface of the receiving waveguide core layer is farther away from a lens than a focal plane of the lens according to an embodiment of this application.

It should be noted that, for the receiving waveguide core layer 22 whose first end surface 221 is at the defocus distance $L_1$ from the focal plane PP', the first end surface 221 of the receiving waveguide core layer 22 can be closer to the lens 10 than the focal plane PP' of the lens 10 (FIG. 2). At this time, the echo signal output by the lens 10 forms a light spot 2 on the side of the lens 10 with the second optical surface 12, and an area of projection of the light spot 2 on the photonic chip 20 is larger than an area of projection of the light spot 2 on the focal plane PP' of the lens 10. Certainly, the first end surface 221 of the receiving waveguide core layer 22 can also be farther away from the lens 10 than the focal plane PP' of the lens 10 (FIG. 4). At this time, the echo signal output by the lens 10 forms a light spot 2 on the side of the lens 10 with the second optical surface 12, and an area of projection of the light spot 2 on the focal plane PP' of the lens 10 is less than an area of projection of the light spot 2 on the photonic chip 20. The "area of projection of the light spot 2 on the photonic chip 20" may be an area of orthographic projection of the light spot 2 on the first end surface 221 of the receiving waveguide core layer 22 along a direction parallel to the optical axis OO' of the lens 10 (that is, the first preset direction AA'), or may also be an area of oblique projection of the light spot 2 on the first end surface 221 of the receiving waveguide core layer 22 along a direction intersecting with the optical axis OO' of the lens 10. The "area of projection of the light spot 2 on the focal plane PP' of the lens 10" is an area of orthographic projection of the light spot 2 on the focal plane PP' of the lens 10 along a direction parallel to the optical axis OO' of the lens 10.

Based on the LiDAR in the embodiments of this application, compared with a method for designing the first end surface 221 of the receiving waveguide core layer 22 to be coplanar with the focal plane PP' of the lens 10, in the method for setting a distance between the first end surface 221 of the at least one receiving waveguide core layer 22 and the focal plane PP' of the lens 10, a light spot 2 formed by the echo signal output by the lens 10 on a side of the lens 10 with the second optical surface 12 actually forms a larger light spot after being incident on the photonic chip 20. In this way, when the light spot 2 moves to in between two adjacent receiving waveguide core layers 22, a ratio of an area of the light spot 2 incident on the receiving waveguide core layer 22 to a total area of the light spot becomes larger, and therefore, the optical coupling efficiency of the echo signal can be improved, thereby improving light detection performance of the LiDAR.

In this embodiment, there is a distance between a first end surface 221 of each receiving waveguide core layer 22 and a focal plane PP' of the lens 10. Certainly, in another embodiment of this application, in all the receiving waveguide core layers 22, there may also be distances between the first end surfaces 221 of some receiving waveguide core layers 22 and the focal plane PP' of the lens 10, and first end surfaces 221 of the other receiving waveguide core layers 22 are coplanar with the focal plane PP' of the lens 10.

It should be additionally noted that the "optical coupling efficiency" in this application refers to a ratio of energy of the echo signal that is received by the receiving waveguide core layer 22 and that is used for coherent detection together with the local oscillator signal to energy of the echo signal reaching a surface of the photonic chip 20. The projection of the light spot 2 formed by the echo signal output by the lens 10 on the side of the lens 10 with the second optical surface 12 onto the photonic chip 20 may only cover a first end surface 221 of one receiving waveguide core layer 22, or may cover first end surfaces 221 of multiple receiving waveguide core layers 22. When the light spot 2 only covers the first end surface 221 of the receiving waveguide core layer 22, the optical coupling efficiency of the echo signal can be obtained by calculating a ratio of an area of projection of the light spot 2 onto the first end surface 221 of the receiving waveguide core layer 22 to an area of the light spot; or when the light spot 2 covers the first end surfaces 221 of the multiple receiving waveguide core layers 22, the optical coupling efficiency of the echo signal can be obtained by calculating a ratio of the maximum area of projection of the light spot 2 onto the first end surfaces 221 of the multiple receiving waveguide core layers 22 to the area of the light spot.

Figure 5:
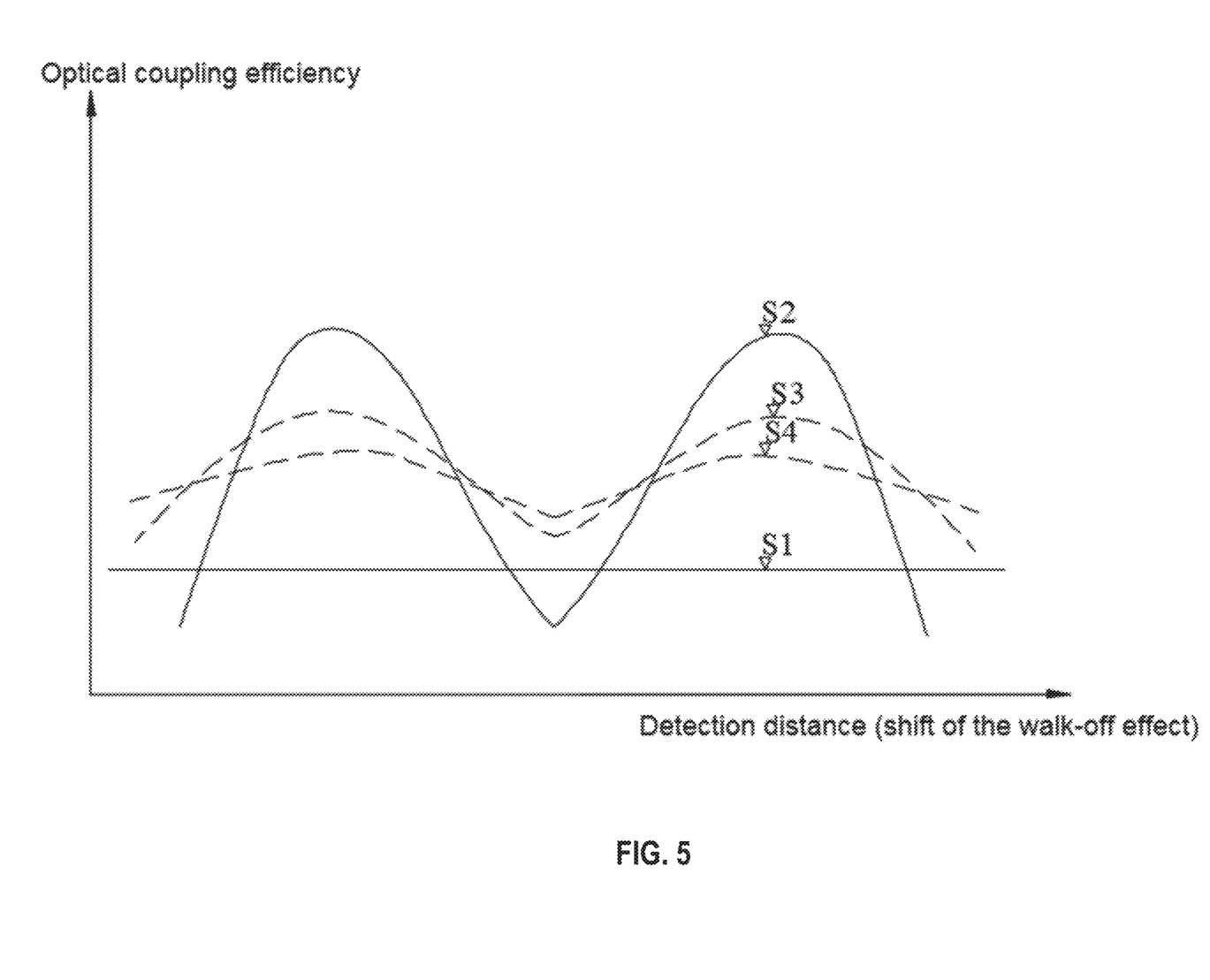
FIG. 5 is a schematic diagram of a curve of optical coupling efficiency of echo signals output by a lens at different defocus distances in this application.
Figure 6:
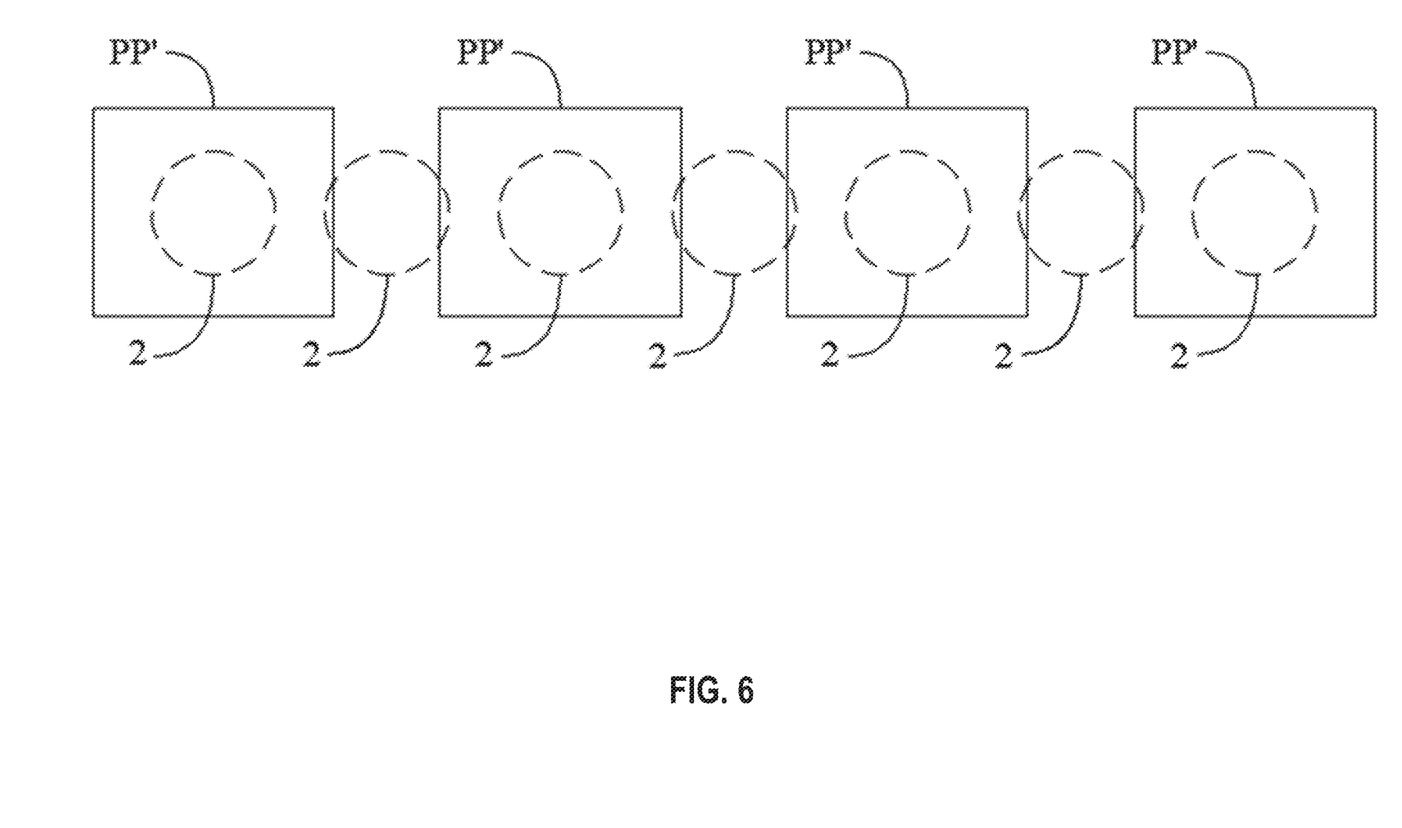
FIG. 6 is a schematic structural diagram illustrating that a light spot corresponding to a curve S2 in FIG. 5 is incident on an end surface of a photonic chip.
Figure 7:
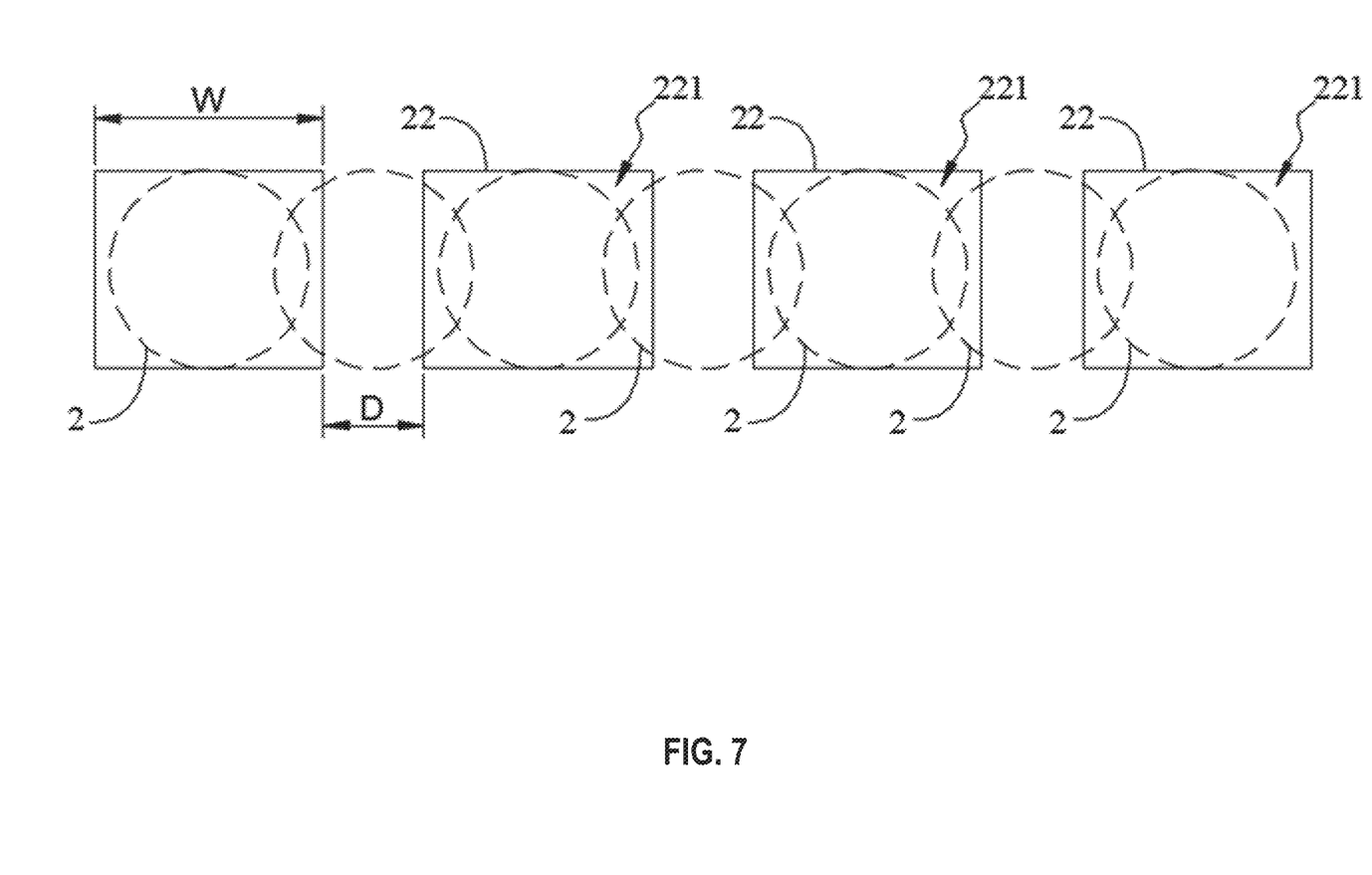
FIG. 7 is a schematic structural diagram illustrating that a light spot corresponding to a curve S3 in FIG. 5 is incident on an end surface of a photonic chip.
Figure 8:
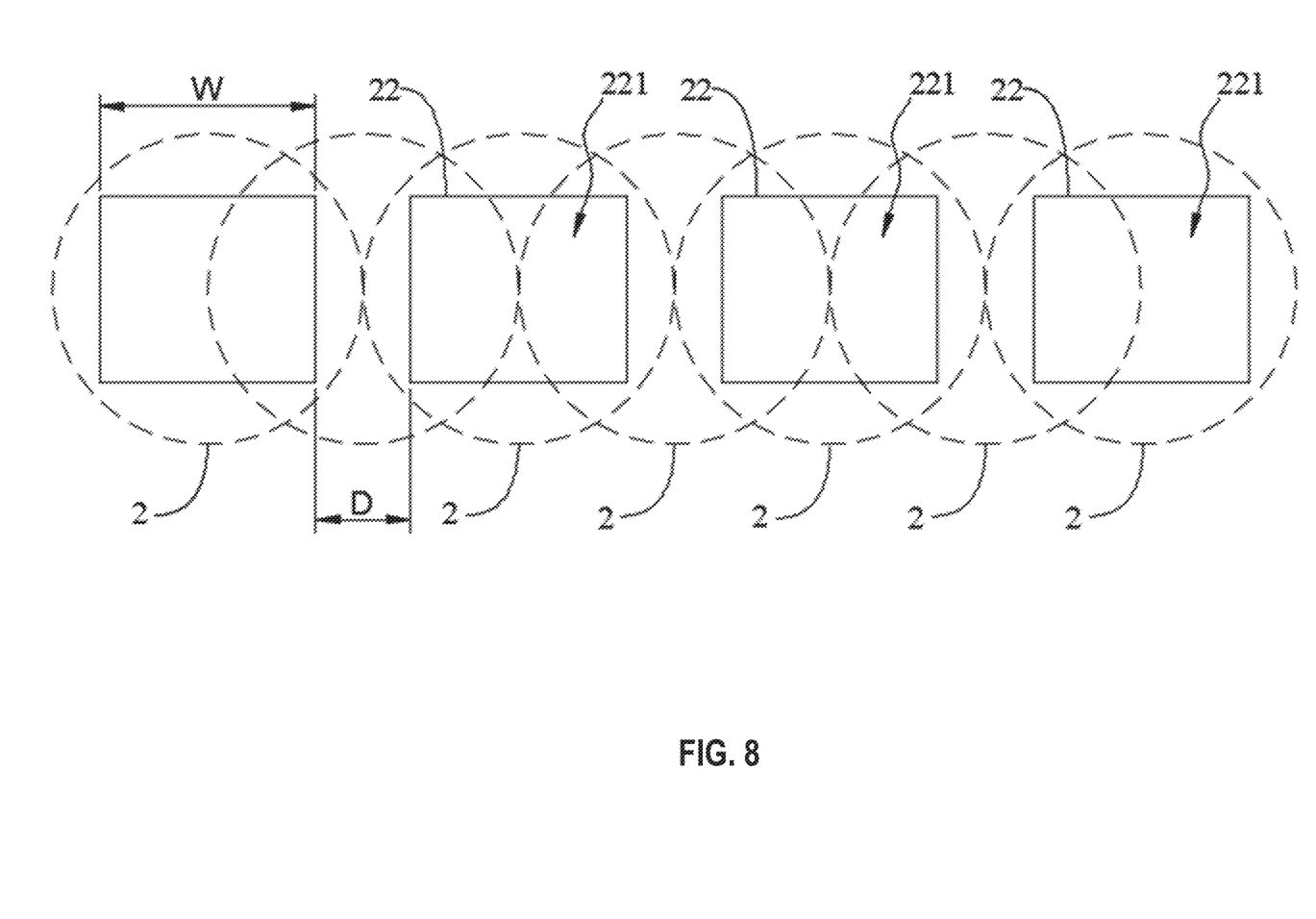
FIG. 8 is a schematic structural diagram illustrating that a light spot corresponding to a curve S4 in FIG. 5 is incident on an end surface of a photonic chip.

As shown in FIG. 5 to FIG. 8, FIG. 5 is a diagram of an optical coupling efficiency curve of echo signals at different defocus distances $L_1$. The abscissa represents a detection distance (or shift of the walk-off effect) measured in meters (if the abscissa represents the shift of the walk-off effect, the shift of the walk-off effect is measured in μm), and the ordinate represents the optical coupling efficiency. A curve S1 in FIG. 5 represents a preset threshold that needs to be met by the optical coupling efficiency of the echo signal in the LiDAR, and is a horizontal line. An echo signal having optical coupling efficiency greater than the preset threshold after entering the receiving waveguide core layer 22 is a valid signal. An echo signal having optical coupling efficiency less than the preset threshold after entering the receiving waveguide core layer 22 is an invalid signal. A curve S2 in FIG. 5 represents a curve indicating that the optical coupling efficiency of the echo signal entering the receiving waveguide core layer 22 changes along with a detection distance when the first end surface 221 of the receiving waveguide core layer 22 overlaps with the focal plane PP' of the lens 10. Projection of the light spot 2 corresponding to the curve S2 onto the surface of the photonic chip 20 is shown in FIG. 6. A curve S3 in FIG. 5 represents a curve indicating that the optical coupling efficiency of the echo signal entering the receiving waveguide core layer 22 changes along with a detection distance when there is a first defocus distance between the first end surface 221 of the receiving waveguide core layer 22 and the focal plane PP' of the lens 10. Projection of the light spot 2 corresponding to the curve S3 onto the surface of the photonic chip 20 is shown in FIG. 7. A curve S4 in FIG. 5 represents a curve indicating that the optical coupling efficiency of the echo signal entering the receiving waveguide core layer 22 changes along with a detection distance when there is a second defocus distance between the first end surface 221 of the receiving waveguide core layer 22 and the focal plane PP' of the lens 10. Projection of the light spot corresponding to the curve S4 onto the surface of the photonic chip 20 is shown in FIG. 8. The second defocus distance is greater than the first defocus distance. In FIG. 5, the curve S1 is used as a dividing line. For each curve, the greater the part above the curve S1, the greater the optical coupling efficiency of the echo signal in a matching scenario of the photonic chip 20 corresponding to the curve and the lens 10. In addition, the flatter the shape of each curve, the more uniform the optical coupling efficiency of the echo signal in the matching scenario of the photonic chip 20 corresponding to the curve and the lens 10, and the higher the optical coupling efficiency of the light spot 2 when between two waveguides. On the contrary, the greater the part below the curve S1, the lower the optical coupling efficiency of the echo signal at the defocus distance $L_1$ corresponding to the curve. It can be seen from FIG. 5 that the optical coupling efficiency of the echo signal in the curve S4 is better than that of the echo signal in the curve S3, and the optical coupling efficiency of the echo signal in the curve S3 is better than that of the echo signal in the curve S2. That is, within a specific defocus range, the optical coupling efficiency increases as the defocus distance increases.

In addition, it should be additionally noted that because the detection distance is small and the energy of the echo signal is high, even if some optical coupling efficiency is reduced during short-distance detection, detection performance of the LiDAR is not greatly affected. Correspondingly, when the detection distance increases and the echo signal is emitted out of one receiving waveguide core layer 22 and enters another receiving waveguide core layer 22, the LiDAR provided in this embodiment of this application can improve the optical coupling efficiency during this process, and then improve the optical coupling efficiency and optical power of the echo signal corresponding to detection for a slightly longer distance, which is of great significance.

It should be understood that although the calculation method for the optical coupling efficiency is obtained in the foregoing method in this embodiment, in another embodiment of this application, a calculation method for the optical coupling efficiency can also be obtained by calculating a ratio of a sum of areas of projection of the light spot 2 onto all the receiving waveguide core layers 22 to an area of the light spot. A specific obtaining method is not limited in this application, provided that the same standard is used for calculation when the curve shown in FIG. 5 is obtained.

Further, as shown in FIG. 2 and FIG. 4, it can be understood that when there are distances between the first end surfaces 221 of all the receiving waveguide core layers 22 and the focal plane PP' of the lens 10, it is possible that distances between first end surfaces 221 of some receiving waveguide core layers 22 and the focal plane PP' of the lens 10 are first defocus distances, and distances between first end surfaces 221 of the other receiving waveguide core layers 22 and the focal plane PP' of the lens 10 are second defocus distances. The first defocus distance and the second defocus distance are unequal. To reduce overall processing difficulty of the photonic chip 20, in some embodiments, distances between the first end surfaces 221 of all the receiving waveguide core layers 22 and the focal plane PP' of the lens 10 are designed to be equal along the first preset direction AA' (that is, the direction of the optical axis OO' of the lens 10).

Further, as shown in FIG. 2 and FIG. 4, it can be understood that the echo signal output by the lens 10 forms a light spot 2 on the side of the lens 10 with the second optical surface 12. When the first end surface 221 of the receiving waveguide core layer 22 is farther away from the lens 10 than the focal plane PP' of the lens 10, a distance between the lens 10 and the first end surface 221 of the receiving waveguide core layer 22 is equal to the focal length of the lens 10 plus the foregoing "defocus distance $L_1$". To reduce the overall volume of the LiDAR, in some embodiments, the focal plane PP' of the lens 10 is designed to be located between the first end surface 221 and the second end surface 222 of at least one receiving waveguide core layer 22 along the first preset direction AA'. At this time, a distance between the lens 10 and the first end surface 221 of the receiving waveguide core layer 22 is equal to the focal length of the lens 10 minus the foregoing "defocus distance $L_1$". Preferably, when distances between the first end surfaces 221 of all the receiving waveguide core layers 22 and the focal plane PP' of the lens 10 are equal along the first preset direction AA', the focal plane PP' of the lens 10 is located between the first end surfaces 221 and the second end surfaces 222 of all the receiving waveguide core layers 22.

Further, referring to FIG. 7 and FIG. 8 again, in a case that the focal length of the lens 10 and the maximum incident angle of the receiving waveguide core layer 22 are relatively definite, a value of the defocus distance $L_1$ determines a value of the area of the projection of the light spot 2 formed by the echo signal output by the lens 10 on the side of the lens 10 with the second optical surface 12 onto the photonic chip 20, and therefore, determines the optical coupling efficiency of the echo signal. For example, the larger the defocus distance $L_1$, the larger the value of the area of the projection of the light spot 2 formed by the echo signal output by the lens 10 on the side of the lens 10 with the second optical surface 12 onto the photonic chip 20, and possibly, the higher the optical coupling efficiency the echo signal. Certainly, this does not mean that the defocus distance $L_1$ is preferably as large as possible. An excessively large defocus distance $L_1$ is not conducive to concentration of energy of the light spot 2 onto the photonic chip 20, and also affects optical power for the echo signal to enter the receiving waveguide core layer 22. Therefore, to ensure better optical coupling efficiency and optical power for the echo signal to enter the receiving waveguide core layer 22, and ensure optimal light detection performance of the LiDAR, a specific limitation on the defocus distance $L_1$ may include, but is not limited to, one or more of the following embodiments.

In the first embodiment, $5 \,\mu m \leq L_1 \leq 60 \,\mu m$. For example, a specific value of the defocus distance $L_1$ may be, but is not limited to, 5 μm, 8 μm, 10 μm, 15 μm, 20 μm, 25 μm, 30 μm, 35 μm, 40 μm, 45 μm, 50 μm, 55 μm or 60 μm. Generally, the maximum linear size of the light spot 2 formed by the echo signal on the surface of the photonic chip 20 along the second preset direction BB' is between 3 μm and 20 μm, and the maximum incident angle of the receiving waveguide core layer 22 is between 10° and 40°. Based on the foregoing parameters, it can be seen that the defocus distance $L_1$ is between 3.8 mm to 113 mm. Certainly, not only the size of the light spot 2 formed by the echo signal needs to fall within a proper range, the LiDAR also needs to have a volume as small as possible, and therefore, the defocus distance $L_1$ is preferably between 5 mm and 60 mm.

In a second embodiment, $D/(2 \tan \theta) < L_1 < (W+D)/(2 \tan \theta)$, where θ is an angle (that is, the maximum incident angle of the receiving waveguide core layer 22) corresponding to a numerical aperture of the receiving waveguide core layer 22, W is width of the receiving waveguide core layer 22 along the second preset direction BB', and D is the distance between two adjacent receiving waveguide core layers 22. Through such setting, on the one hand, the maximum linear size of the light spot 2 formed by the echo signal in the second preset direction BB' is larger than the distance between the two adjacent receiving waveguide core layers 22, to ensure that the light spot 2 can enter at least one receiving waveguide core layer 22 when located between the two receiving waveguide core layers 22, thereby improving the optical coupling efficiency of the light spot 2 when located between the two adjacent receiving waveguide core layers 22; on the other hand, the maximum size of the light spot 2 formed by the echo signal in the second preset direction BB' is less than a sum of width of the receiving waveguide core layer 22 and the distance between the two adjacent receiving waveguide core layers 22, to prevent an excessively large size of the light spot formed by the echo signal from causing a disadvantage of excessively low optical power of the light spot when entering the receiving waveguide core layer 22 finally.

Optionally, the photonic chip 20 meets: 100 nm≤W≤500 nm. For example, a specific value of W can be, but is not limited to, 100 nm, 150 nm, 200 nm, 250 nm, 300 nm, 350 nm, 400 nm, 450 nm or 500 nm. Such setting is intended to ensure that the size of the first end surface 221 of the receiving waveguide core layer 22 is appropriate, so that the echo signal propagates in a single mode in the receiving waveguide core layer 22. When the value of W exceeds a lower limit of the foregoing formula, the size of the first end surface 221 of the receiving waveguide core layer 22 is excessively small, which hinders the light spot 2 formed by the echo signal output by the lens 10 on the side of the lens 10 with the second optical surface 12 from being incident on the first end surface 221 of the receiving waveguide core layer 22 and from propagating within the receiving waveguide core layer 22. When the value of W exceeds an upper limit of the foregoing formula, the echo signal is likely to excite multiple modes in the receiving waveguide core layer 22, thereby affecting efficiency of subsequent beat frequency together with the local oscillator signal.

Optionally, the photonic chip 20 meets: 1 μm≤D≤10 μm. For example, a specific value of D may be, but is not limited to, 1 μm, 2 μm, 3 μm, 4 μm, 5 μm, 6 μm, 7 μm, 8 μm, 9 μm or 10 μm. In this design, by designing the value of D properly, when the value of D satisfies the foregoing formula, the value of the distance between the two adjacent receiving waveguide core layers 22 is more appropriate, and the area of the projection of the light spot 2 formed by the echo signal output by the lens 10 on the side of the lens 10 with the second optical surface 12 into the gap between the two adjacent receiving waveguide core layers 22 is small, so that projection of the light spot 2 onto the surface of the receiving photonic chip 20 can fall onto the first end surface 221 of the receiving waveguide core layer 22 as much as possible, to improve the optical coupling efficiency of the echo signal as much as possible, thereby optimizing the light detection performance of the LiDAR. When the value of D exceeds the lower limit of the foregoing formula, the distance between adjacent receiving waveguide core layers 22 is excessively small, which is not conducive to overall processing of the photonic chip 20 and also needs more receiving waveguide core layers 22 to cover the same detection distance. When the value of D exceeds an upper limit of the foregoing formula, the distance between the two adjacent receiving waveguide core layers 22 is excessively large, and the area of the projection of the light spot 2 formed by the echo signal output by the lens 10 on the side of the lens 10 with the second optical surface 12 into the gap between the two adjacent receiving waveguide core layers 22 is large, and therefore, an area of projection of the light spot 2 onto the first end surface 221 of the receiving waveguide core layer 22 is small, and the optical coupling efficiency of the echo signal is low, which hinders optimization of the light detection performance of the LiDAR.

Further, as shown in FIG. 2 and FIG. 4, it can be understood that distances between any two adjacent receiving waveguide core layers 22 along the second preset direction BB' may be unequal. In other words, all the receiving waveguide core layers 22 may be spaced unequally along the second preset direction BB'. To reduce overall processing difficulty of the photonic chip 20, in some embodiments, any two adjacent receiving waveguide core layers 22 are equally spaced along the second preset direction BB'. That is, all the receiving waveguide core layers 22 are equally spaced along the second preset direction BB'.

Figure 9:
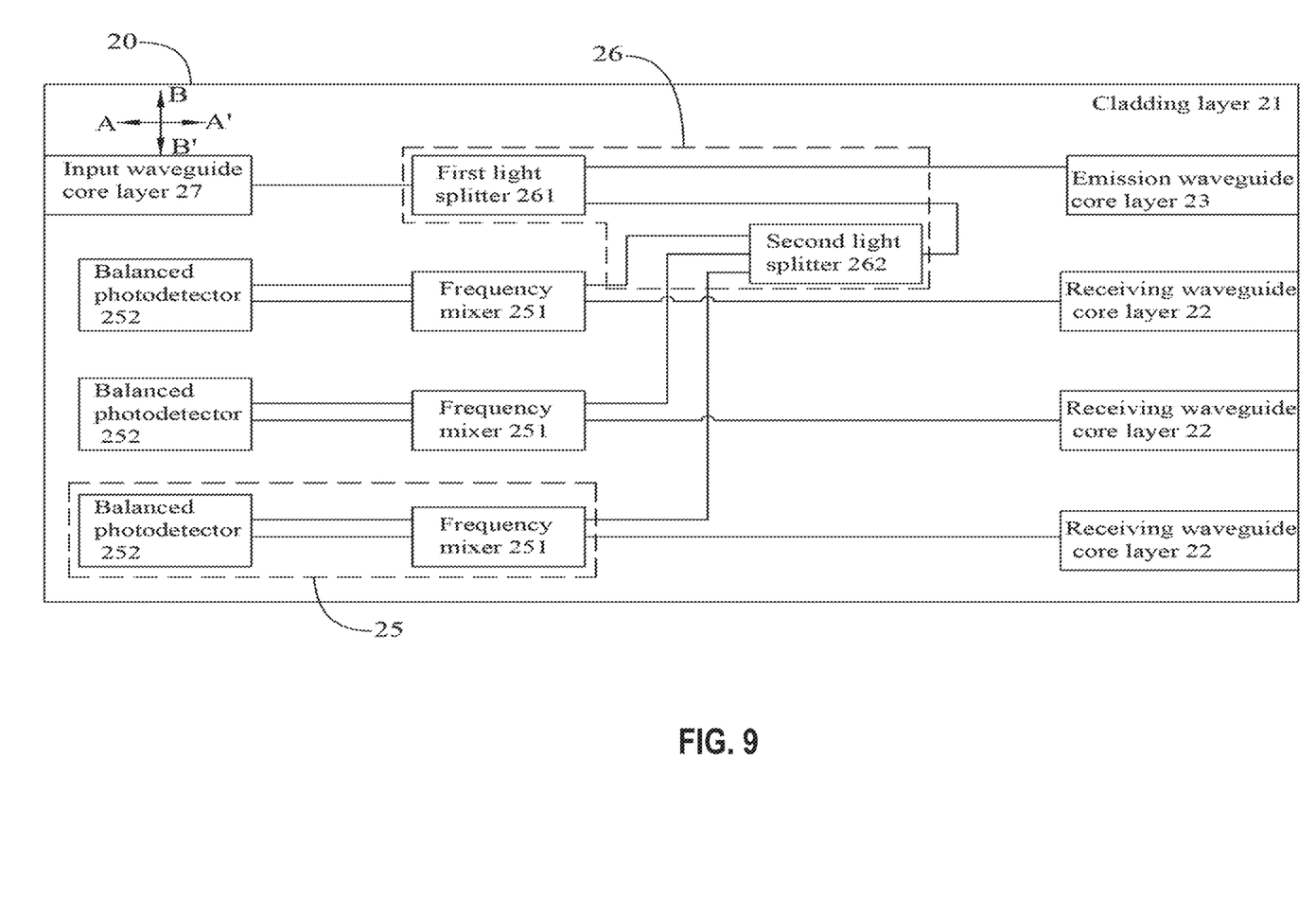
FIG. 9 is a schematic structural diagram of a photonic chip according to an embodiment of this application.
Figure 10:
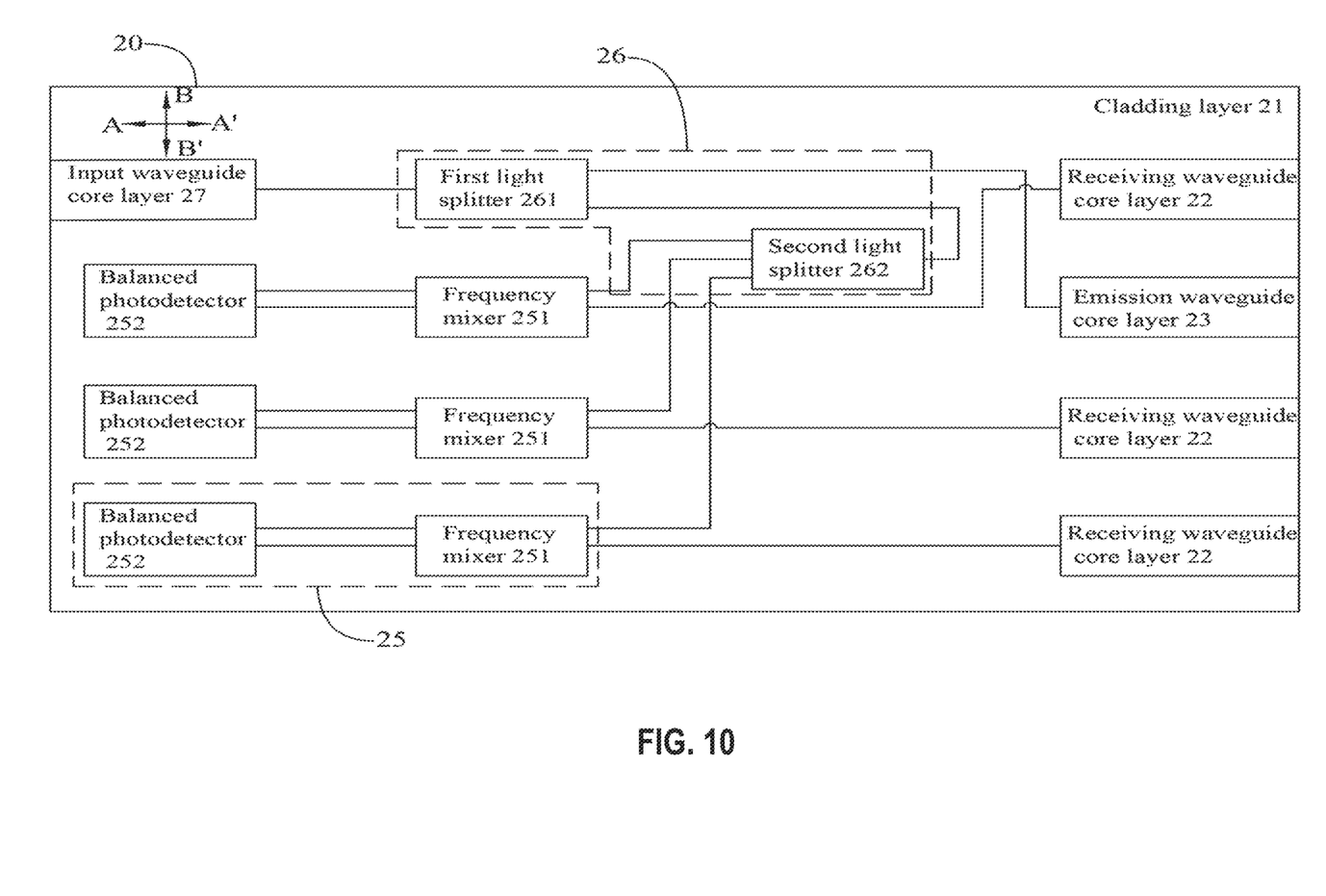
FIG. 10 is a schematic structural diagram of a photonic chip according to another embodiment of this application.

Further, as shown in FIG. 9 and FIG. 10, to improve an integration level of the photonic chip 20, the photonic chip 20 further includes an emission waveguide core layer 23. The emission waveguide core layer 23 is embedded in the foregoing cladding layer 21 and forms an optical waveguide structure together with the cladding layer 21. The emission waveguide core layer is configured to receive a detection signal generated by the LiDAR, and output the detection signal to the outside of the photonic chip 20 to detect the target object. The LiDAR emits a detection signal to the target object through the photonic chip 20, then receives an echo signal reflected or scattered by the target object through the photonic chip 20, compares the received echo signal with one local oscillator signal, and can obtain relevant parameters such as distance, azimuth, height, speed, attitude and even a shape of the target object after proper processing. It should be noted that the foregoing lens 10 can also be configured to receive the detection signal emitted by the LiDAR to the target object, that is, the lens 10 configured to receive the detection signal and the lens 10 configured to receive the echo signal are the same lens 10. In this case, the detection signal enters the lens 10 through the second optical surface 12 and exits the lens 10 from the first optical surface 11, and is directed to the target object after being collimated by the lens 10. Certainly, the lens 10 for receiving the detection signal may also be another lens 10 independent of the lens 10 for receiving the echo signal.

In some embodiments, the emission waveguide core layer 23 is located at one end of the cladding layer 21 that is closer to the lens 10. The emission waveguide core layer 23 extends along the first preset direction AA'. The optical axis OO' of the lens 10 passes through the emission waveguide core layer 23. The lens 10 is also configured to collimate the laser beam output from the emission waveguide core layer 23. In some embodiments, an end surface of the emission waveguide core layer 23 that faces toward the lens 10 overlaps with the focal plane PP' of the lens 10, and collimated laser beams are parallel beams. At this time, it should be noted that because the end surface of the emission waveguide core layer 23 is located on the foregoing focal plane PP' and there is a distance between the first end surface 221 of the receiving waveguide core layer 22 and the foregoing focal plane PP', the end surface of the emission waveguide core layer 23 that faces toward the lens 10 and the first end surface 221 of the receiving waveguide core layer 22 are not in the same plane. At this time, the end surface of the cladding layer 21 that is closer to the lens 10 is a step-shaped surface. It can be understood that, in some other embodiments of this application, there may also be a distance between the end surface of the emission waveguide core layer 23 that faces toward the lens 10 and the focal plane PP' of the lens 10, that is, the emission waveguide core layer is disposed relative to the lens in a defocus manner. The first end surfaces 221 of the emission waveguide core layer 23 and the receiving waveguide core layer 22 can be located in the same plane. In this case, the end surface of the cladding layer 21 that is closer to the lens 10 is a plane. Further, to ensure that the detection signal emitted through the emission waveguide core layer 23 and the lens 10 is parallel beams or approximately parallel beams, the photonic chip 20 may also include a micro lens (not shown in the figure), and the micro lens is disposed on the end surface of the emission waveguide core layer 23 that is closer to the lens 10 and is configured to collimate the detection signal output by the emission waveguide core layer 23, so that laser beams passing through the photonic chip 20 subsequently are approximately parallel beams.

As for positions of the receiving waveguide core layers 22 relative to the emission waveguide core layer 23, as shown in FIG. 9, all the receiving waveguide core layers 22 may be located on the same side of the emission waveguide core layer 23 along the foregoing second preset direction BB'; or as shown in FIG. 10, all the receiving waveguide core layers 22 may also be disposed separately on two sides of the emission waveguide core layer 23 along the foregoing second preset direction BB', that is, at least two receiving waveguide core layers 22 are located on two sides of the emission waveguide core layer 23. It should be noted that, taking the second preset direction BB' corresponding to a direction of the walk-off effect caused in the horizontal scanning direction as an example, a design in which all the receiving waveguide core layers 22 are located on the same side of the emission waveguide core layer 23 is suitable for a situation in which the horizontal scanning direction is a one-way scanning direction, for example, scanning using a rotating mirror; and a design in which the receiving waveguide core layers 22 are located on two sides of the emission waveguide core layer 23 separately is suitable for a situation in which a horizontal scanning direction is a two-way scanning direction, for example, scanning using a galvanometer.

Further, as shown in FIG. 9 and FIG. 10, to further improve an integration level of the photonic chip 20, in some embodiments, the photonic chip 20 also includes a photoelectric detection module 25. The photoelectric detection module 25 is configured to receive a local oscillator signal generated by the LiDAR and the echo signal output through the second end surface 222 of the receiving waveguide core layer 22. Each photoelectric detection module 25 is disposed corresponding to one receiving waveguide core layer 22.

In some embodiments, each photoelectric detection module 25 includes a frequency mixer 251 and a balanced photodetector 252. The frequency mixer 251 has two input ports, one input port is configured to receive the local oscillator signal generated by the LiDAR, and the other input port is configured to receive the echo signal output by the foregoing receiving waveguide core layer 22. The local oscillator signal and the echo signal can be subjected to frequency beating in the frequency mixer 251 to obtain two beat frequency signals. The frequency mixer 251 may be a 180-degree frequency mixer 251, and a difference between phases of the two beat frequency signals output by the frequency mixer 251 is 180 degrees. The balanced photodetector 252 is connected to an output end of the frequency mixer 251. The balanced photodetector 252 is configured to perform balance detection on the two beat frequency signals, thereby obtaining two electrical signals related to the two beat frequency signals. An information processing module of the LiDAR can calculate relevant detection information such as distance, speed and reflectivity of the target object relative to the LiDAR based on the foregoing two electrical signals. It should be noted that a specific manifestation form of the photoelectric detection module 25 is not limited to inclusion of the frequency mixer 251 and the balanced photodetector 252. A photoelectric detection module 25 in another specific manifestation form can also be used, provided that the photoelectric detection module 25 in another specific manifestation form can receive the foregoing local oscillator signal and the foregoing detection signal, and can convert the foregoing beat frequency signal generated based on the local oscillator signal and the detection signal into the foregoing electrical signal. For example, in some other embodiments, the photoelectric detection module 25 includes a photodetector, and the photodetector not only can be configured to receive the foregoing local oscillator signal and the foregoing detection signal to subject the foregoing local oscillator signal and the foregoing detection signal to frequency beating to generate the foregoing beat frequency signal, but also can convert the generated beat frequency signal into the foregoing electrical signal.

Further, as shown in FIG. 9 and FIG. 10, to further improve the integration level of the photonic chip 20, in some embodiments, the photonic chip 20 further includes an input waveguide core layer 27 and a light splitting module 26. The input waveguide core layer 27 is configured to receive the source light signal generated by the LiDAR. The light splitting module 26 is configured to receive the source light signal output by the input waveguide core layer 27 and split the source light signal into at least a detection signal and two or more local oscillator signals, the detection signal is output to the emission waveguide core layer 23, and the local oscillator signal is output to the photoelectric detection module 25.

In some embodiments, the input waveguide core layer 27 is embedded in the foregoing cladding layer 21 and forms an optical waveguide structure together with the cladding layer 21. The light splitting module 26 includes a first light splitter 261 and a second light splitter 262. A part of the source light signal output by the input waveguide core layer 27 is split into the foregoing detection signal by the first light splitter 261, and the remaining part of the source light signal output by the input waveguide core layer 27 is sequentially split into multiple beams of the foregoing local oscillator signals by the first light splitter 261 and the second light splitter 262.

Further, as shown in FIG. 9 and FIG. 10, in some embodiments, the LiDAR also includes a laser (not shown in the figure), and the LiDAR is configured to generate a source light signal.

In some embodiments, the source light signal is generated by a laser and output to the input waveguide core layer 27, and a part of the source light signal output by the input waveguide core layer 27 is split into the foregoing detection signal by the first light splitter 261. A remaining part of the source light signal output by the input waveguide core layer 27 is sequentially split into multiple beams of the foregoing local oscillator signals by the first light splitter 261 and the second light splitter 262. The detection signal output by the first light splitter 261 is output to the target object via the emission waveguide core layer 23. The detection signal is reflected or scattered by the target object to form an echo signal, and both the echo signal and the local oscillator signal are output to the frequency mixer 251. The frequency mixer 251 subjects the echo signal and the local oscillator signal to frequency beating to generate two beat frequency signals, and the two beat frequency signals are output to the balanced photodetector 252 through two output ends of the frequency mixer 251. The two beat frequency signals are subjected to balance detection processing by the balanced photodetector 252 to generate two electrical signals, and the two electrical signals are output to the information processing module of the LiDAR through the output end of the balanced photodetector 252. After the two electrical signals are subjected to information processing by the information processing module of the LiDAR, the relevant detection information such as distance, speed and reflectivity of the target object relative to the LiDAR can be obtained.

In summary, the LiDAR provided in this embodiment of this application includes a lens 10 and a photonic chip 20. There is a distance between the first end surface 221 of the receiving waveguide core layer 22 in the photonic chip 20 and the focal plane PP' of the lens 10, so that the light spot of the echo signal projected to the surface of the photonic chip 20 is large, and an area of the light spot projected to the first end surface 221 of the receiving waveguide core layer 22 accounts for a larger proportion when the light spot is located between two adjacent receiving waveguide core layers 22, which can alleviate the current situation of low minimum optical coupling efficiency of the echo signal to some extent. Therefore, the LiDAR can have better detection performance.

A second aspect of this application provides a mobile device, where the mobile device includes the foregoing LiDAR. The mobile device can include, but is not limited to, a smart device such as a vehicle, a robot or an unmanned aerial vehicle. In such a design, the mobile device having the foregoing LiDAR can also alleviate an existing problem that the minimum optical coupling efficiency of an echo signal is low due to a walk-off effect in related art.

The same or similar reference signs in the drawings of the embodiments correspond to the same or similar components. In descriptions of this application, it should be understood that azimuth or position relationships indicated by terms such as "above", "under", "left", and "right" are based on the azimuth or position relationships shown in the accompanying drawings, are merely intended to describe this application and simplify the descriptions, but are not intended to indicate or imply that the specified device or element shall have specific azimuth or be formed and operated in specific azimuth, and therefore, the terms for describing the position relationships in the drawings are only used for exemplary illustration, and should not be construed as a limitation on this patent. A person of ordinary skill in the art can understand specific meanings of the foregoing terms based on a specific situation.

The foregoing descriptions are only preferred embodiments of this application, and are not intended to limit this application. Any modification, equivalent replacement and improvement made within the spirit and principle of this application shall be included within the protection scope of this application.

What is claimed is:

1. A LiDAR, comprising a lens and a photonic chip, wherein:
    an optical axis of the lens extends along a first preset direction, wherein the lens is configured to receive an echo signal and to output the echo signal to the photonic chip, and the echo signal is formed after a detection signal emitted by the LiDAR is reflected or scattered by a target object;
    the photonic chip and the lens are spaced apart along the first preset direction, and the photonic chip comprises a cladding layer embedded with two or more receiving waveguide core layers and an emission waveguide core layer, wherein
    an end surface of the cladding layer closer to the lens forms a step-shaped surface;
    the two or more receiving waveguide core layers and the emission waveguide core layer are located on the step-shaped surface;
    each receiving waveguide core layer has a first end surface and a second end surface opposite to each other, wherein the first end surface is closer to the lens than the second end surface, and the first end surface is configured to receive the echo signal output by the lens;
    the two or more receiving waveguide core layers are spaced apart from each other along a second preset direction, and the second preset direction intersects with the first preset direction;
    the first end surface of at least one receiving waveguide core layer is spaced apart from a focal plane of the lens by a distance;
    the emission waveguide core layer is configured to receive a detection signal generated by the LiDAR and to output the detection signal to outside of the photonic chip to detect the target object;
    the emission waveguide core layer extends along the first preset direction;
    the optical axis of the lens passes through the emission waveguide core layer; and
    an end surface of the emission waveguide core layer that faces toward the lens overlaps with the focal plane of the lens and is not in a same plane with the first end surface of at least one receiving waveguide core layer.

2. The LiDAR according to claim 1, wherein there is a distance between a first end surface of each receiving waveguide core layer and the focal plane.

3. The LiDAR according to claim 2, wherein distances between first end surfaces and the focal plane along the first preset direction are equal.

4. The LiDAR according to claim 1, wherein the focal plane is between the first end surface and the second end surface of the at least one receiving waveguide core layer along the first preset direction.

5. The LiDAR according to claim 1, wherein the distance between the first end surface and the focal plane is a defocus distance L1, and the defocus distance L1 satisfies at least one of following conditions:
    (a) $5\ \mu m \le L1 \le 60\ \mu m$; and
    (b) $D/(2 \tan \theta) < L1 < (W+D)/(2 \tan \theta)$, wherein $\theta$ is an angle corresponding to a numerical aperture of each receiving waveguide core layer, W is width of each receiving waveguide core layer along the second preset direction, and D is a distance between two adjacent receiving waveguide core layers.

6. The LiDAR according to claim 5, wherein the photonic chip satisfies following conditions:
    (c) $100\ nm \le W \le 500\ nm$, wherein W is the width of each receiving waveguide core layer along the second preset direction; and
    (d) $1\ \mu m \le D \le 10\ \mu m$, wherein D is the distance between two adjacent receiving waveguide core layers.

7. The LiDAR according to claim 1, wherein distances between any two adjacent receiving waveguide core layers along the second preset direction are equal.

8. The LiDAR according to claim 1, wherein the receiving waveguide core layers are located on the same side of the emission waveguide core layer along the second preset direction.

9. The LiDAR according to claim 1, wherein at least two receiving waveguide core layers are disposed on two sides of the emission waveguide core layer separately along the second preset direction.

10. The LiDAR according to claim 1, wherein the photonic chip further comprises a photoelectric detection module; and
    wherein the photoelectric detection module is configured to receive a local oscillator signal generated by the LiDAR and the echo signal output via the second end surface of a receiving waveguide core layer.

11. The LiDAR according to claim 10, wherein the photonic chip further comprises:
- an input waveguide core layer, configured to receive a source light signal generated by the LiDAR; and
- a light splitting module, configured to receive the source light signal output by the input waveguide core layer, and to split the source light signal into at least the detection signal and two or more local oscillator signals, wherein the detection signal is output to the emission waveguide core layer, and the local oscillator signals are output to the photoelectric detection module.

12. The LiDAR according to claim 11 further comprises a laser, wherein the laser is configured to generate the source light signal.

13. A mobile device, comprising a LiDAR comprising a lens and a photonic chip, wherein:
- an optical axis of the lens extends along a first preset direction, wherein the lens is configured to receive an echo signal and to output the echo signal to the photonic chip, and the echo signal is formed after a detection signal emitted by the LiDAR is reflected or scattered by a target object;
- the photonic chip and the lens are spaced apart along the first preset direction, and the photonic chip comprises a cladding layer embedded with two or more receiving waveguide core layers and an emission waveguide core layer, wherein
- an end surface of the cladding layer closer to the lens forms a step-shaped surface;
- the two or more receiving waveguide core layers and the emission waveguide core layer are located on the step-shaped surface;
- each receiving waveguide core layer has a first end surface and a second end surface opposite to each other, wherein the first end surface is closer to the lens than the second end surface, and the first end surface is configured to receive the echo signal output by the lens;
- the two or more receiving waveguide core layers are spaced apart from each other along a second preset direction, and the second preset direction intersects with the first preset direction;
- the first end surface of at least one receiving waveguide core layer is spaced apart from a focal plane of the lens by a distance;
- the emission waveguide core layer is configured to receive a detection signal generated by the LiDAR and to output the detection signal to outside of the photonic chip to detect the target object;
- the emission waveguide core layer extends along the first preset direction;
- the optical axis of the lens passes through the emission waveguide core layer; and an end surface of the emission waveguide core layer that faces toward the lens overlaps with the focal plane of the lens and is and is not in a same plane with the first end surface of at least one receiving waveguide core layer.

\* \* \* \* \*